United States Patent [19]

Frait

[11] 4,398,252
[45] Aug. 9, 1983

[54] ELECTRIC CONTROLLER HAVING OUTPUT POWER LIMITING CIRCUIT

[75] Inventor: John S. Frait, Ann Arbor, Mich.

[73] Assignee: Kelsey-Hayes Co., Romulus, Mich.

[21] Appl. No.: 255,596

[22] Filed: Apr. 20, 1981

[51] Int. Cl.³ .............................................. B60T 13/68
[52] U.S. Cl. .................................. 364/426; 188/3 R; 303/20
[58] Field of Search ...................... 364/426; 303/7, 20; 188/3 R; 340/650, 653, 664

[56] References Cited

U.S. PATENT DOCUMENTS

| | | | |
|---|---|---|---|
| 3,503,652 | 3/1970 | Vandenbroek | 303/20 X |
| 3,909,075 | 9/1975 | Pittet, Jr. et al. | 303/20 X |
| 3,967,863 | 7/1976 | Tomecek et al. | 303/20 X |
| 4,084,859 | 4/1978 | Bull et al. | 303/20 X |
| 4,254,998 | 3/1981 | Marshall et al. | 303/20 |
| 4,295,687 | 10/1981 | Becker et al. | 303/20 |

Primary Examiner—Jerry Smith
Attorney, Agent, or Firm—Ralph J. Skinkiss; Oliver E. Todd; Mark J. Sobanski

[57] ABSTRACT

An electronic control for electrically operated brakes utilizing solid state electronic components to control the braking mechanism in a towed vehicle. A transducer develops a control signal corresponding to the braking effort desired, and may be actuated by the hydraulic brake system of the towing vehicle or, alternately, may be actuated from the brake foot pedal itself or from a manual control. Power is applied to the brakes as a pulsating voltage, the pulse width of which is varied in response to the control signal. The pulse width is decreased with increasing currents to limit the power in the circuit when a short occurs in the towed vehicle brake circuit. The electronic control also may be used in other applications.

8 Claims, 4 Drawing Figures

ELECTRIC CONTROLLER HAVING OUTPUT POWER LIMITING CIRCUIT

BACKGROUND OF THE INVENTION

This invention relates to electric controllers and more particularly to an electric controller for supplying power to, for example, electric brake systems to be used by a towed vehicle when being pulled by a towing vehicle.

Recreational and utility trailers adapted to be towed by automobiles and small trucks and many similar towed vehicles are commonly provided with electric brakes. The electric brakes generally comprise a pair of brake shoes which, when actuated, frictionally engage a brake drum. An electromagnet is mounted on an end of a lever which actuates the brake shoes. When an electric current is applied to the magnet, the magnet is drawn against the rotating brake drum which pivots the lever for actuating the brakes. The braking force is proportional to the electric current applied to the magnet. Controls for electrically operated brakes must be easily adjustable to accommodate different relative weights of the towed and towing vehicles. The controls further must be predictable to give the driver of the towing vehicle a feeling of smooth control and positive brake operation both upon applying the braking effort to the towing vehicle and also upon releasing the braking effort.

The braking system for the towed vehicle typically is actuated either in response to hydraulic pressure in the braking system of the towing vehicle or in response to the pressure applied by a driver's foot on a transducer mounted on the towing vehicle's brake pedal or in response to a manually operated control. In one type of electronic control for electrically operated brakes, a pulse modulator generates a pulsating voltage having a pulse width which is varied with the amount of braking effort desired for the towed vehicle. The electronic control is protected against short circuit conditions in the circuit for the brake actuating magnets. In the event of a sudden short circuit, the pulse output from the pulse modulator is disabled to protect the circuit. The pulse output may be disabled for several pulses and then reestablished to determine if the short circuit condition was momentary or if it still exists. Circuitry of this type for protecting against short circuits in the output of an electronic brake control works quite well for protecting the control in the event of sudden and complete short circuits. However the circuit is not designed to handle partial short circuits which act as a resistance and causes a higher than normal output current from the brake control which is below the level which causes an interruption in output from the control.

SUMMARY OF THE INVENTION

According to the present invention, an improved solid state electronic control system is provided for supplying controlled power to, for example, the braking mechanism in a towed vehicle. The brakes are actuated in response to a signal corresponding to the braking effort desired. This signal is generated by a conventional transducer, such as a pressure sensing transducer located in the hydraulic brake system of the towing vehicle or a transducer which measures the pressure applied by a driver to the brake pedal for the towing vehicle or in response to a manually generated signal. The control system is provided with improved protection against short circuits in the circuit interconnecting the electronic brake signal generator with the electric brakes in the towed vehicle. The brakes in the towed vehicle are actuated by a pulse signal. In the event of a partial or resistive short circuit, the pulse width is decreased to limit the output power from the electronic controller. In other words, each pulse applied by the electronic controller to the brake circuit is cut short in response to an over current condition to limit the output power from the brake controller to a nondestructive level. As the current demand increases, each pulse is cut short at an earlier point. The output current load at which the output power is limited is selectable and can be varied in response to temperature and to the power source voltage. In the event that a short circuit is momentary, full power will be reestablished immediately to the towed vehicle brakes upon removal of the short circuit.

Accordingly, it is an object of the invention to provide an improved electronic control suitable for use in a brake system for towed vehicles.

Another object of the invention is to provide an improved electronic controller having circuit protection against partial or complete short circuits in the output circuit.

Other objects and advantages of the invention will become apparent from the following detailed description, with reference being made to the accompanying drawings.

DESCRIPTION OF THE PREFERRED EMBODIMENTS

Figure 1:
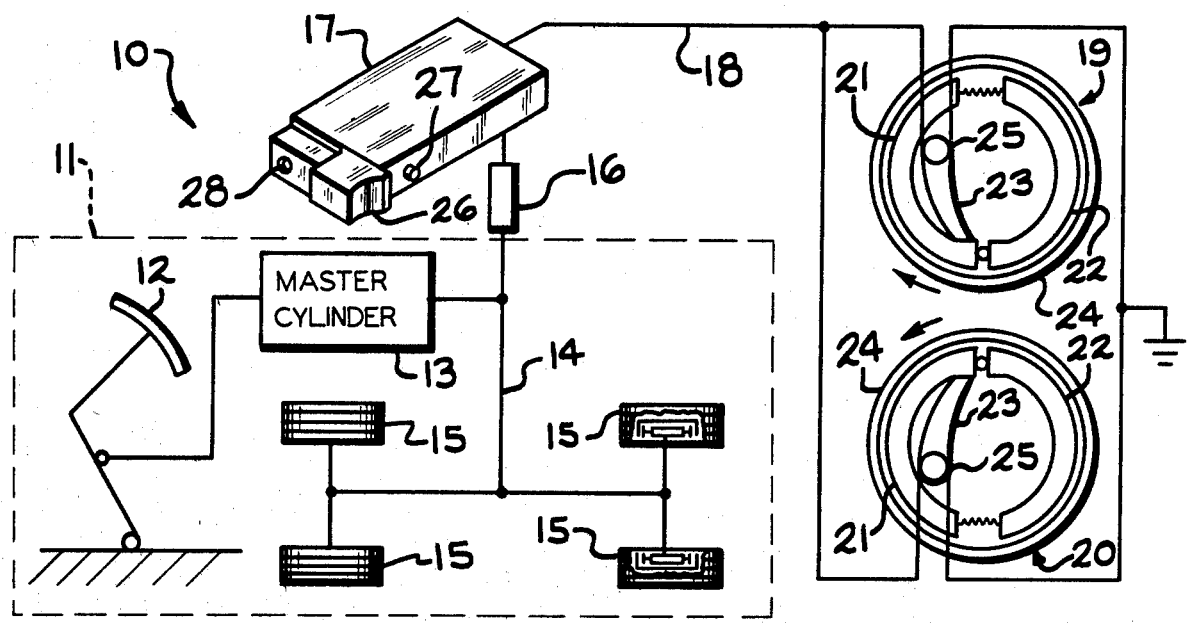
FIG. 1 is a diagrammatic illustration of an electronic brake system for a towed vehicle incorporating the control of the invention.

Turning now to the drawings and particularly to FIG. 1, a brake system 10 is illustrated for a combined towing vehicle and towed vehicle such as an automobile or pickup truck towing a recreational or utility trailer. A conventional brake system for the towing vehicle is illustrated within the dashed line 11 and includes a driver operated brake pedal 12, a master cylinder 13 and hydraulic lines 14 for supplying brake fluid to conventional drum or disc brakes located at each of the vehicle wheels 15. When a vehicle driver applies pressure to the brake pedal 12, a piston is moved in the master cylinder 13 to increase the pressure of the brake fluid applied through the lines 14 to the brakes at each of the individual wheels 15. The pressure of the fluid within the brake lines 14 is proportional to the braking force.

In the illustrated brake system 10, a pressure transducer 16 is connected to the brake lines 14 for generating an electric signal proportional to the pressure of the brake fluid within the lines 14. This signal is applied to an electronic controller 17 which in turn generates and applies an electric signal over a wire 18 to electric brakes 19 and 20 for the wheels of the towed vehicle. The electric brakes 19 and 20 each include a pair of brake shoes 21 and 22 which, when actuated by a lever 23, are expanded into contact with a brake drum 24 for braking the wheels of the towed vehicle. A separate electromagnet 25 is mounted on an end of each of the brake actuating levers 23. Each electromagnet 25 is positioned to abut the generally flat side of a brake drum 24. As an electric current is passed through each of the electromagnets 25, the electromagnets are drawn into contact with the brake drums 24 and the resulting drag pivots the levers 23 to engage the brakes 19 and 20 in a conventional manner.

During normal operation of the towing and towed vehicles, the electronic controller 17 applies an output signal to the wire 18 for actuating the towed vehicle brakes 19 and 20 in response to output from the transducer 16. The transducer 16 has been described as being a pressure transducer responsive to the hydraulic pressure within the brake lines 14. However, it should be noted that other types of transducers may be used for generating signals proportional to the braking force. For example, a transducer may be mounted on the brake pedal 12 for generating a signal which is proportional to the force applied by the driver's foot to the brake pedal 12. Such a signal would be applied to the electronic controller 17 in place of the signal from the transducer 16. In addition, it is sometimes desirable to manually actuate the brakes 19 and 20 in the towed vehicle. This may be desirable, for example, to stabilize the towed vehicle against vacillations or swinging caused by strong side winds. Therefore, a manual slide switch 26 is provided on the electronic controller 17 to allow the vehicle driver to manually apply the towed vehicle brakes 19 and 20 without applying the towing vehicle brakes. The electronic controller 17 also is provided with a manual gain control 27. The gain control 27 allows the vehicle driver to compensate for different loads in the towed vehicle. For example, as the load in the towed vehicle increases, it is necessary to increase the braking force in the towed vehicle relative to the braking force applied in the towing vehicle. By adjusting the gain control 27, the power applied by the electronic controller 17 to the electromagnets 25 may be increased or decreased for any given output from the towing vehicle brake pressure sensing transducer 16. The electronic brake controller 17 also is provided with an indicator light 28. The light 28 is energized with an intensity proportional to the signal applied to the wire 18 to actuate the towed vehicle brakes 19 and 20. The light 28 provides a visual indication to the driver to show that the controller 17 and the towed vehicle brakes are operating properly.

Figure 2:
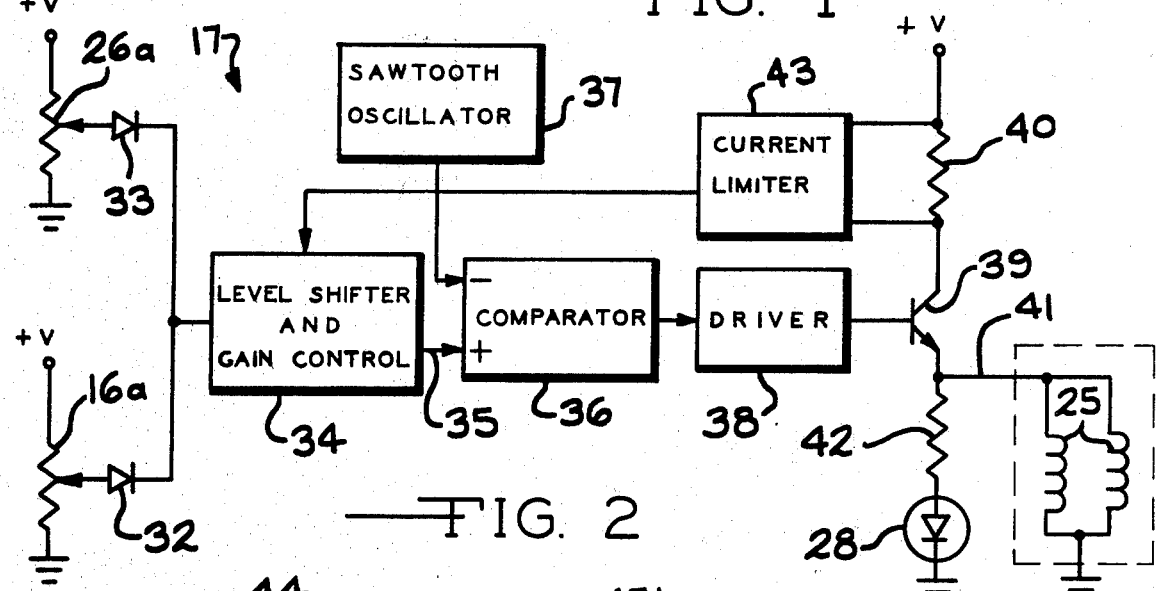
FIG. 2 is a schematic block diagram of the electronic controller of the present invention connected for operating electric brakes in a towed vehicle.

Turning now to FIG. 2, a block diagram is shown for the circuit of the electronic controller 17. Both the brake pressure sensing transducer 16 and the manual slide switch 26 are depicted as potentiometers 16a and 26a, respectively, which apply a variable voltage through a diode 32 or 33, respectively, to a level shifter and gain control 34. The level shifter and gain control 34 applies an output voltage on a line 35 to one input of a comparator 36. This voltage is proportional in magnitude to a desired braking force, as established by either the transducer 16 or the manually operated switch 26. A sawtooth wave oscillator 37 applies a signal to a second input of the comparator 36 which is compared with the signal on the output 35 from the level shifter and gain control 34. Whenever the magnitude of the voltage on the output 35 is higher than the voltage on the output from the sawtooth wave oscillator 37, the comparator 36 will generate an output voltage which is applied to a driver 38. The driver 38 establishes an output in response to an output from the comparator 36 for controlling a switching transistor 39. The transistor 39 has collector-emitter electrodes which are connected in series between a power source such as the battery for the towing vehicle, a current sensing resistor 40 and a junction 41. The junction 41 is connected through the parallel windings of the electromagnets 25 for the brakes 19 and 20 to ground and also is connected through a series current limiting resistor 42 and the light 28 to ground. The light 28 may be a light emitting diode (LED), as shown. When the transistor 39 is turned on, current will flow simultaneously through each of the electromagnets 25 and the series resistor 42 and the light 28.

Problems sometimes occur with short circuits in the brake circuit in a towed vehicle. The short circuit may be caused, for example, by screws coming out of connectors and moving around as the towed vehicle is jolted by rough roads. Abrasion of wire insulation also can cause short circuits. Most short circuits in an electric brake system for a towed vehicle are intermittent in nature. Furthermore, many shorts are only partial shorts in that the short acts as a low value resistance. When a short circuit does occur, there will be an increased current flow through the current sensing resistor 40 and the switching transistor 39. If the short circuit is a complete short or if a partial short circuit is maintained for very long, excessive currents may destroy the switching transistor 39. Therefore, the electronic controller 17 is provided with a protection circuit for limiting the output in the event of a partial or complete short circuit. It will be apparent that as the current through the current sensing resistor 40 and the switching transistor 39 increases, the voltage appearing across the current sensing resistor 40 similarly will increase. This voltage is applied to a current limiter 43 which in turn applies a signal to the level shifter and gain control 34 to decrease the voltage applied on the output 35 to the comparator 36 when excessive currents are encountered.

Figure 3:
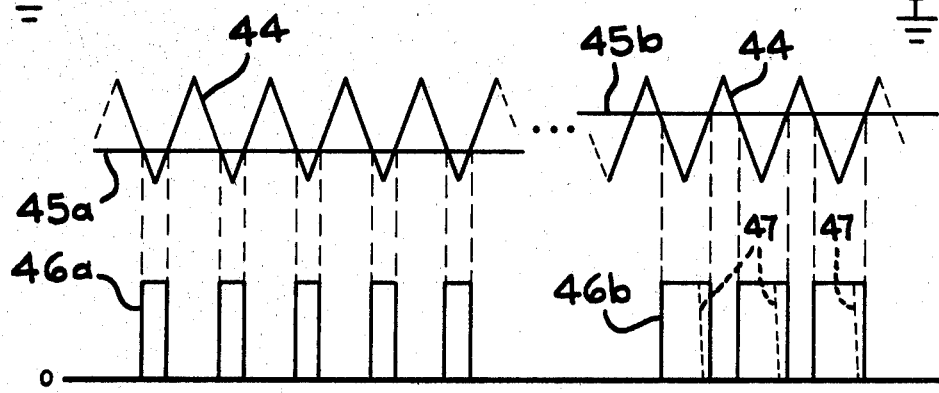
FIG. 3 is a graph depicting exemplary input voltages to the comparator and the resulting output pulses from the comparator in the block diagram of FIG. 2.

Referring now to FIGS. 2 and 3, the operation of the electronic controller 17 is illustrated in greater detail. The sawtooth oscillator 37 generates an output waveform 44. The waveform 44 will have a constant frequency which may be, for example, on the order of 400 Hz. to 600 Hz., although frequencies outside this range also may be used. The towing vehicle brake pressure transducer 16 generates an output voltage which is proportional to the force applied by the driver to the brake pedal 12. The output voltage from the transducer 16 is illustrated as a first constant voltage level 45a at the left portion of FIG. 3 and at a higher level 45b at the right of the graph of FIG. 3. This would represent the condition where the driver applies a light brake force initially, and, subsequently, a heavier braking force to the pedal 12. When the transducer 16 generates the lower level output voltage 45a, the voltage 45a will be above the output waveform 44 from the oscillator 37 only for short periods in each cycle. During these short periods, the comparator 36 generates relatively narrow pulses 46a which are applied to the driver 38. As the level of the voltage on the output 35 from the level shifter and gain control 34 increases to the level 45b, it will be seen that the comparator 36 will have an output in the form of pulses 46b which have a greater width than the pulses 46a. Since the pulses are wider and there is no change in frequency, there is a greater duty cycle. Under a maximum braking condition, the width of the pulses 46b may increase until the comparator 36 applies a constant voltage to the driver 38 to fully actuate the towed vehicle brakes 19 and 20. In the event that a partial short circuit occurs while the transducer 16 and the level shifter and gain 34 generates the output voltage 45b, the excessive current will cause the output pulses 46b to be terminated short, such as along the exemplary dashed line 47. By terminating the pulses 46b early, the duty cycle for the transistor 39 is shortened to limit the power dissipated by the transistor 39 and, therefore, to protect the transistor 39 from destruction. In the event of a total short circuit connecting the junction 41 to ground, the width of output pulses from the comparator 36 will be shortened so as to terminate almost simultaneously with the beginning of each pulse. Therefore, the transistor 39 will be switched on and off almost simultaneously.

Figure 4:
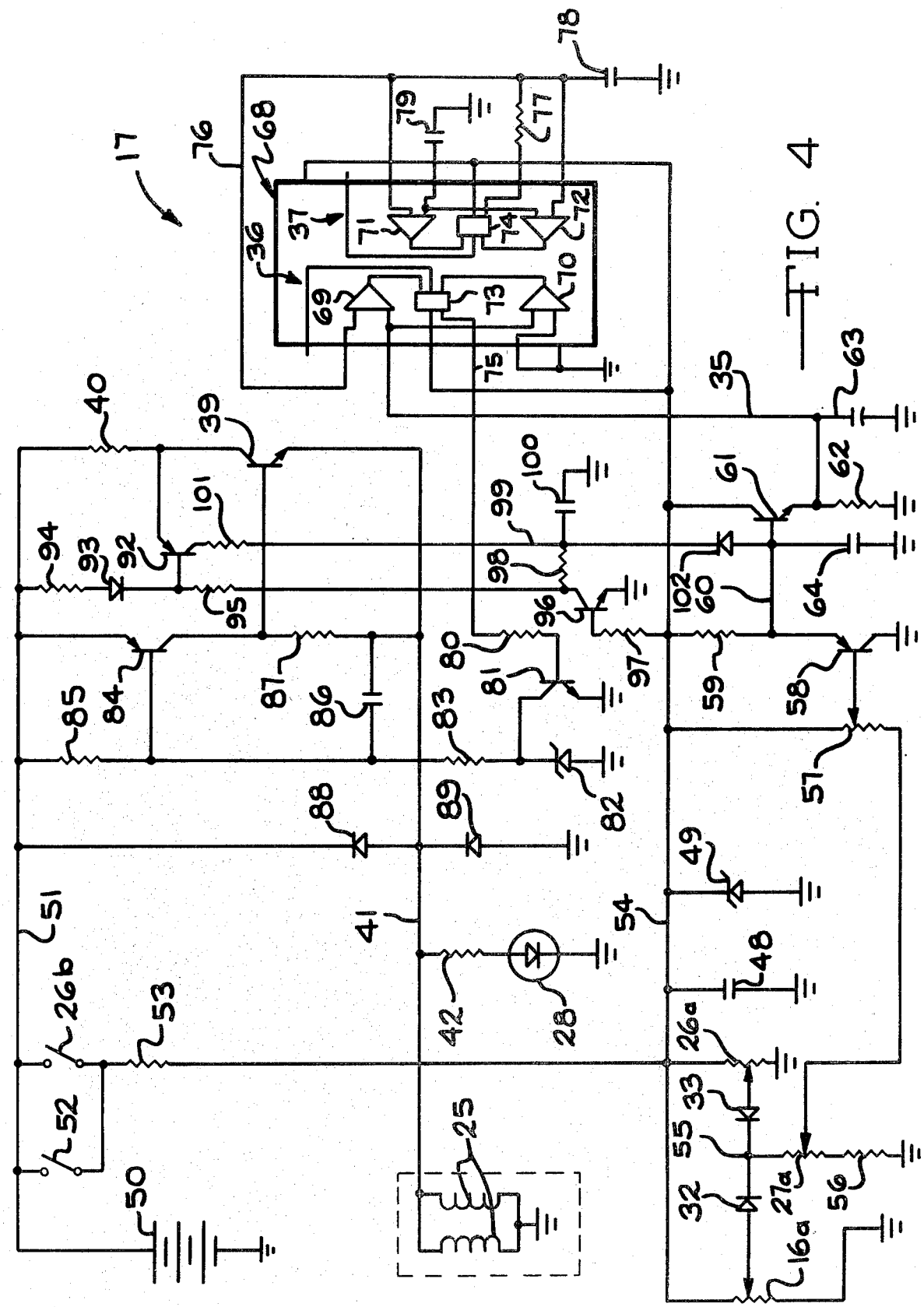
FIG. 4 is a detailed schematic circuit diagram of an electronic controller constructed in accordance with the present invention.

Turning now to FIG. 4, a detailed schematic circuit diagram is shown for electronic controller 17. The towing vehicle has a battery 50 which is connected between ground and a bus 51. The bus 51 is connected through a switch 52 and a second, parallel switch 26b and a series resistor 53 to a bus 54. The switch 52 may comprise the switch which controls the brake lights in the towing vehicle or may be a separate switch mounted so as to be activated whenever a driver applies pressure to the vehicle brake pedal 12. The switch 26b is incorporated along with the potentiometer 26a into the manual slide switch 26 so as to be closed whenever the slide switch 26 is actuated. Consequently, whenever the vehicle brakes are applied or the slide switch 26 is manually actuated, a voltage is applied from the battery 50 to the bus 54. The voltage on the bus 54 is regulated by a parallel zener diode 49 and capacitor 48. The bus 54 is connected through the transducer potentiometer 16a to ground and also through the slide switch potentiometer 26a to ground. The potentiometer 16a has a variable voltage tap connected through the diode 32 to a junction 55 and the potentiometer 26a has a variable voltage tap connected through the diode 33 to the junction 55. Therefore, a portion of the voltage on the bus 54 will be applied to the junction 55, depending upon the output of the transducer 16 and/or the output of the manual slide switch 26. The junction 55 is connected through a potentiometer 27a and a fixed resistor 56 to ground. The potentiometer 27a forms the gain control 27 (shown in FIG. 1) and has a tap connected through a potentiometer 57 back to the bus 54. The potentiometer 57 is a trim control and has a variable output tap connected to the base of a transistor 58.

The trim control potentiometer 57 is adjusted during calibration of electronic controller 17 so that the minimum voltage applied to the base of the transistor 58 is a predetermined percentage of the voltage on the bus 54, such as one-third of the voltage on the bus 54. The transistor 58 has a grounded collector and an emitter connected through a resistor 59 to the bus 54. The emitter of the transistor 58 also is connected to a junction 60 which in turn is connected to the base of a second transistor 61. The transistor 61 has a collector connected to the bus 54 and an emitter connected through a parallel resistor 62 and a capacitor 63 to ground. The base of the transistor 61 also is connected through a capacitor 64 to ground. The signal on the emitter of the transistor 61 forms the output 35 from the level shifter and gain control 34 shown in the block diagram of FIG. 2. In operation, the transistors 58 and 61 are operated as emitter followers. The transistor 61 compensates the output of the transistor 58 for changes in voltage and temperature. The voltage applied to the output 35 may be identical to the voltage appearing on the base of the transistor 58. The capacitor 64 is charged to a voltage to establish the duty cycle of the electronic controller 17, as demanded by the setting of either the vehicle brakes or the manual switch 26 on the electronic controller 17.

The functions of the comparator 36 and the sawtooth wave oscillator 37 are performed by a single integrated circuit 68 which may, for example, be a type LM 556 integrated circuit. The integrated circuit includes four comparators 69–72 and two flip flops 73 and 74. The function of the comparator 36 is performed by the comparator 69 within the integrated circuit 68. The comparator 69 has an output passed through the flip flop 73 to a terminal 75. The comparator 70 within the integrated circuit 68 is not used. High impedance inputs to the comparator 69 are connected to the output 35 from the level shifter and gain control 34, as taken from the emitter of the transistor 61, and a high impedance output 76 from the sawtooth wave oscillator 37. The outputs of the two comparators 71 and 72 forming the oscillator 37 are connected to the two inputs to the flip flops 74. The flip flop 74 has an output applied through a resistor 77 to the oscillator output 76. The oscillator output 76 also is connected through a capacitor 78 to ground and is connected to one input for each of the comparators 71 and 72. The other inputs to the comparators 71 and 72 are connected together and through a filter capacitor 79 to ground. The oscillator 37 will generate a waveform on the output 76 having a sawtooth format of the type illustrated by the waveform 44 in FIG. 3. The frequency of this waveform is determined by the values of the capacitor 78 and the resistor 77. The oscillator output 76 is applied to the comparator 69 along with the output 35 from the level shifter and gain control 34. The comparator 69 in turn generates a pulsed output which appears on the terminal 75 of the integrated circuit 68.

The pulsed output from the comparator 36, as taken from the terminal 75, is applied through a resistor 80 to the base of a pre-driver transistor 81. The emitter of the transistor 81 is grounded and the collector of the transistor 81 is connected through a zener diode 82 to ground. The collector of the transistor 81 also is connected through a resistor 83 to the base of a driver transistor 84. The base of the transistor 84 also is connected through a resistor 85 to the bus 51 and through a capacitor 86 to the output junction 41. The emitter of the transistor 84 is connected directly to the bus 51 and the collector is connected to the base of the main output transistor 39 and also through a resistor 87 to the junction 41. The collector of the transistor 39 is connected through the current sensing resistor 40 to the bus 51 and the emitter of the transistor 39 is connected to the output junction 41.

During operation of the electronic controller 17, the comparator 36 will generate output pulses, appearing at the terminal 75 on the integrated circuit 68, having a fixed frequency determined by the frequency of the oscillator 37 and having a pulse width depending upon the output from the transducer 16 and/or the manual slide switch 26. During each pulse appearing on the terminal 75, the pre-driver transistor 81 and the driver transistor 84 will drive the transistor 39 to a fully on state. Consequently, current will flow from the bus 51 through the current sensing resistor 40, the transistors 39 and the junction 41 to the electromagnets 25 for actuating the brakes 19 and 20 on the towed vehicle. At the same time, the voltage appearing on the junction 41 will cause a current to flow through the resistor 42 and the LED 28 the illuminate the LED 28. As voltage pulses are applied to the junction 41, the LED 28 will have an intensity depending upon the duty cycle called for by the transducer 16 or the manual slide switch 26. This variable intensity of the LED 28 will confirm to the vehicle driver that the brake system for the towed vehicle is operating properly. A diode 88 is connected from the junction 41 to the positive bus 51 and a diode 89 is connected from the junction 41 to ground. Normally, the two diodes 88 and 89 are reverse biased. When the switching transistor 39 is turned off, the collapsing magnetic field within the electromagnets 25 will generate a negative spike voltage which appears on the junction 41. The diode 89 will effectively ground the junction 41 for all negative voltages generated by the electromagnets 25 and the diode 88 protects against negative voltages in the power supply. The diode 88 may function to blow a fuse (not shown) in the event that the battery polarity is reversed.

When the transistor 39 is on and current flows to the electromagnets 25, this current also will flow through the current sensing resistor 40, which has a low value. A voltage will appear across the resistor 40 which is directly proportional to the current flow therethrough. In the event of a short circuit or a partial short circuit between the junction 41 and ground, a voltage increase will appear across the resistor 40. This voltage increase is sensed by a transistor 92. The transistor 92 has an emitter connected to the common junction between the resistor 40 and the collector of the transistor 39 and has a collector connected through a diode 93 and a series resistor 94 to the bus 51. The base of the transistor 92 also is connected through a resistor 95 and the collector-emitter junctions of a transistor 96 to ground The transistor 96 has a base connected through a resistor 97 to the bus 54. In addition to the connection to the resistor 95, the collector of the transistor 96 is connected through a resistor 98 to a junction 99. The junction 99 is connected through a capacitor 100 to ground, through a resistor 101 to the collector of the current sensing transistor 92 and through a diode 102 to the junction 60 at the base of the transistor 61.

In operation, the transistor 96 will conduct whenever voltage is applied to the bus 54. Consequently, the base of the current sensing transistor 92 will have a voltage determined by the ratio of the two resistors 94 and 95. The forward biased diode 93 connected between the resistor 94 and the base of the transistor 92 serves for temperature compensation of the operation of the transistor 92. The characteristics of the diode 93 also lower the trip point at which output regulation begins in response to an increase in temperature and in response to a decrease in the voltage on the bus 51. The resistors 94 and 95 are selected so that the transistor 92 will conduct whenever the current through the transistor 39 is within acceptable limits. In the event that the current through the transistor 39 progressively exceeds permissible limits, the transistor 92 will progressively turn off. As the transistor 92 shuts off and the diode 102 ceases to be back biased, the junction 60 at the base of the transistor 61 in the level shifter and gain control 34 will be connected through the diode 102, the resistor 98 and the transistor 96 to ground. Consequently, the capacitor 64 will discharge to a lower voltage through the diode 102, the resistors 98 and the transistor 96 to decrease the duty cycle for the output of the electronic controller 17. In the event of a total short circuit, the capacitor 64 will be discharged to a predetermined minimum voltage. By decreasing the voltage on the capacitor 64, the width of the pulses generated by a comparator 36 will decrease to in turn decrease the width of pulses applied to the output junction 41. This in turn limits the power handled by the output transistor 39 to prevent destruction of the transistor 39. Under a condition where there is a direct short circuit connecting output junction 41 to ground, the transistor 92 will be turned off immediately after the main output transistor 39 is turned on. The capacitor 64 will discharge to the minimum voltage level to in turn terminate the pulse from the comparator 36 which caused the output transistor 39 to be turned on. It should be noted that even when there is a partial or resistive short circuit, power limiting occurs only when the demanded duty cycle exceeds the decreased duty cycle. In other words, if a resistive short circuit is such that the duty cycle is limited at a 75% level, then no output power limiting occurs when the vehicle driver applies the brakes to demand a lower duty cycle, such as a 50% duty cycle.

The transistor 96 and the resistor 97 may be eliminated and the resistors 95 and 98 connected directly to ground. However, a continuous current will then flow from the battery 50 through the resistors 94 and 95 to ground. Although this current will be at a low level, it will present a continuous battery drain. The transistor 96 eliminates this battery drain by acting as an open circuit whenever the electronic controller is turned off. When either the brake actuated switch 52 or the switch 26b of the manual slide switch 26 are closed to apply a voltage to the bus 54, the transistor 96 will be switched on to connect the resistors 95 and 98 to ground. Thus, the transistor 96 protects the battery 50 from a constant current drain when the electronic controller 17 is not in operation.

The electronic controller 17 has been described above for use in an electric brake system 10 for operating electric brakes in a towed vehicle in synchronism with hydraulic brakes in a towing vehicle. However, it should be noted that the electronic controller 17 may be used for other purposes where a variable pulse width D.C. signal is desired with circuit protection in the event of an overload condition. For example, direct current motors sometimes are operated with pulse signals having a duty cycle varied to control the speed of the motor. One such application for the electronic controller is a speed control for an electric trolling motor for fishing boats. Electric trolling motors are operated from storage batteries and speed control typically is achieved through the use of a variable resistor positioned between the battery and the motor. Although the use of a variable resistor is relatively inexpensive, it is wasteful since at mid range speeds half the battery power is dissipated in the resistor. This reduces the range of the motor and/or the trolling time. With the prior art speed controls, the electric trolling motor is susceptible to damage in the event that the propeller becomes fouled in weeds and creates high current conditions in the stalled motor.

The electronic controller 17 can be adapted for driving such a motor merely by connecting the output junction 41 to supply power to a trolling motor rather than to the electromagnets 25. The transducer 16 is replaced with a pedal controlled potentiometer which supplies an adjustable voltage signal to the level shifter and gain control. Or, the circuit of FIG. 4 may be modified since a temperature compensation and circuit accuracy is not required for a trolling motor speed controller. For example, the temperature compensating transistors 58 and 61 and the gain and trim potentiometers 27a and 57 may be eliminated. In this event, the speed control potentiometer applies a portion of the voltage from the output of the current sensing transistor 92 directly to the positive input of the comparator 69 for comparing with the output from the oscillator 37. Current protection is maintained since excessive currents through the current sensing resistor 40 will drop the output voltage from the transistor 92 to in turn drop the voltage applied to the comparator 69.

Various other changes and modifications and applications of the electronic controller 17 will become apparent to those skilled in the art without departing from the spirit and the scope of the following claims.

I claim:

1. An electronic controller for generating a variable duty cycle direct current pulse signal comprising means for generating an analog signal indicative of a desired duty cycle, means responsive to such analog signal for generating a direct current pulsed output signal having such desired duty cycle, means for sensing the current load on such output signal, and means responsive to said sensed current load progressively exceeding a predetermined level for progressively reducing the power in each pulse of such output signal.

2. An electronic controller, as set forth in claim 1, and wherein said means for generating a direct current output signal includes oscillator means for generating a sawtooth wave, means for comparing the level of said analog signal with said sawtooth wave, and means for generating an output whenever the level of said analog signal exceeds the level of said sawtooth wave.

3. An electronic controller, as set forth in claim 2, and wherein said reducing means comprises means responsive to said sensed current load exceeding said predetermined level for reducing the level of said analog signal, and wherein said output generating means generates an output whenever the level of such reduced level analog signal exceeds the level of said sawtooth wave whereby the duty cycle of such output is reduced.

4. An improved electronic controller for supplying power from a D.C. source to electrically operated brakes in a towed vehicle in response to a demand by a driver in a towing vehicle, said brakes drawing a normal current at an operating voltage, said controller comprising means responsive to driver demand for generating an analog signal having a level proportional to a desired braking force, means for generating a direct current pulsed output signal having a duty cycle proportional to such analog signal for operating said brakes, means for sensing the current load on such output signal, and means responsive to said sensed current progressively exceeding a predetermined current above the normal current for progressively reducing the power in each pulse of such output signal.

5. An improved electronic controller for electrically operated brakes in a towed vehicle, as set forth in claim 4, and wherein said direct current pulsed output signal generating means includes oscillator means for generating a sawtooth wave, means for comparing the level of said analog signal with said sawtooth wave, and means for generating an output whenever the level of said analog signal exceeds the level of said sawtooth wave.

6. An improved electronic controller for electrically operated brakes in a towed vehicle, as set forth in claim 5, and wherein said reducing means comprises means responsive to said sensed current load exceeding said predetermined current for reducing the level of said analog signal, and wherein said output generating means generates an output whenever the level of such reduced level analog signal exceeds the level of said sawtooth wave.

7. An improved electronic controller for electrically operated brakes in a towed vehicle, as set forth in claim 4, and further including means responsive to a decrease in voltage from the D.C. source for decreasing said predetermined current.

8. An improved electronic controller for electrically operated brakes in a towed vehicle, as set forth in claim 4, and further including temperature responsive means for decreasing said predetermined current in response to a temperature increase.

* * * * *